Figure 1:
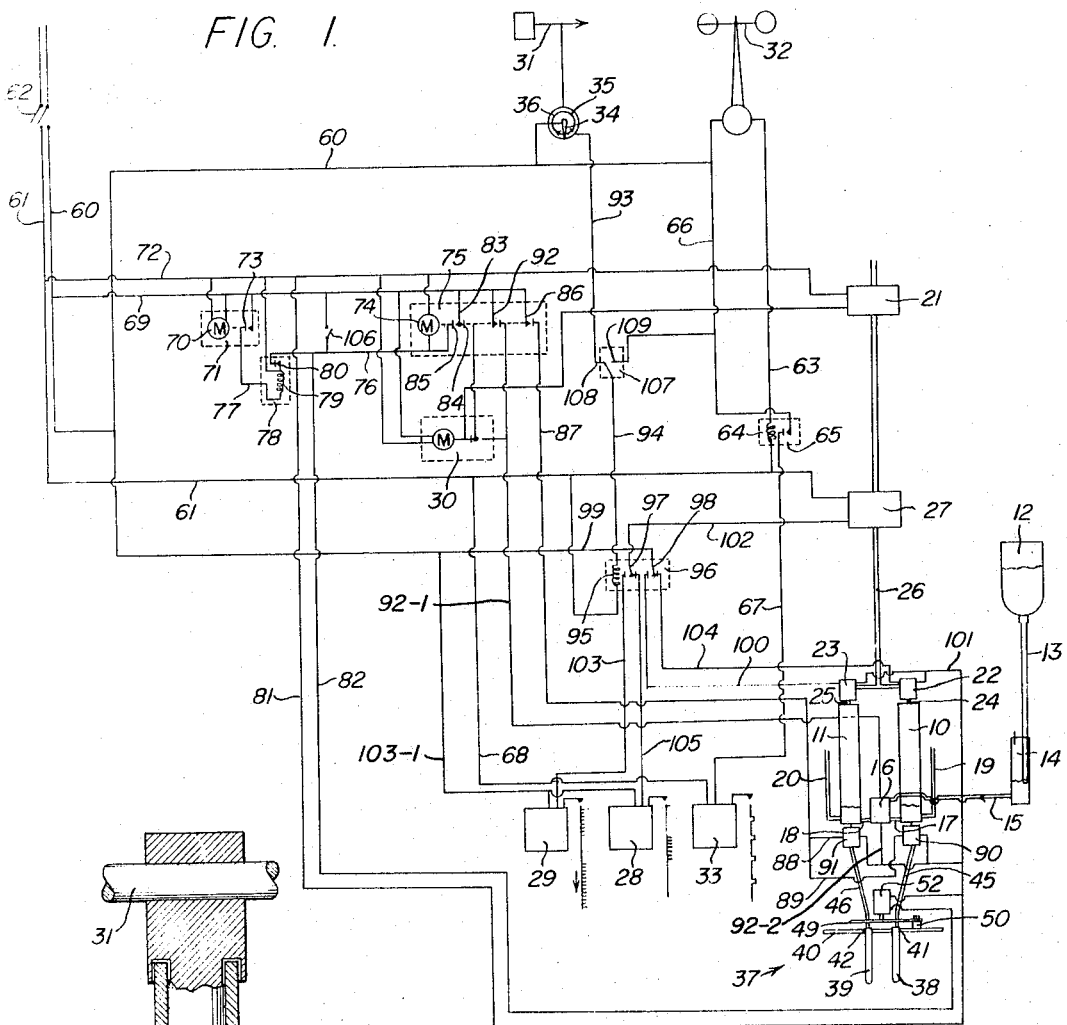

Jan. 24, 1967   A. B. STOUT, JR   3,299,700
DIRECTIONAL AIR SAMPLER

Filed April 2, 1964                    2 Sheets-Sheet 1

INVENTOR.
ALLISON B. STOUT Jr.

BY
ATTORNEYS

Jan. 24, 1967  A. B. STOUT, JR  3,299,700
DIRECTIONAL AIR SAMPLER
Filed April 2, 1964  2 Sheets-Sheet 2
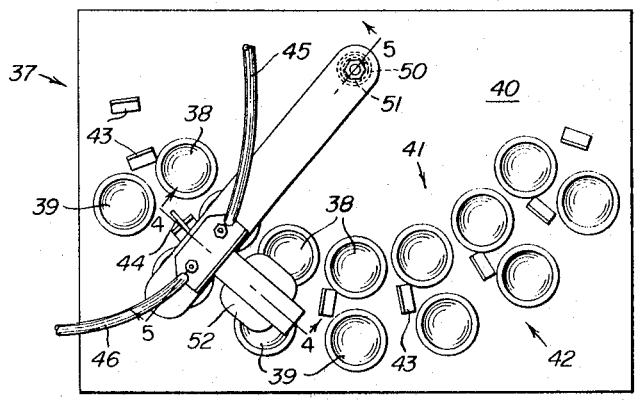
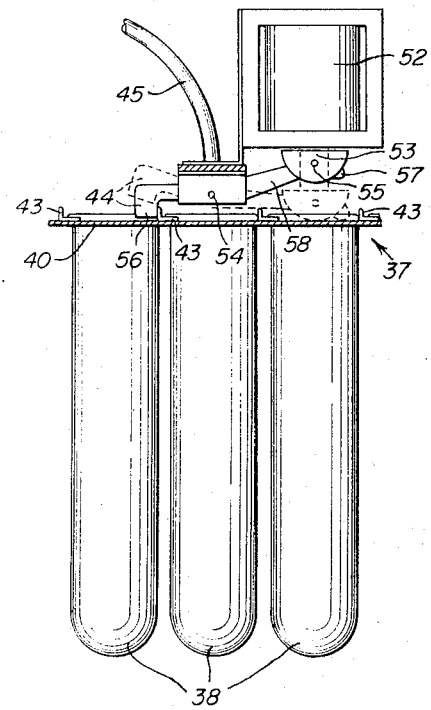
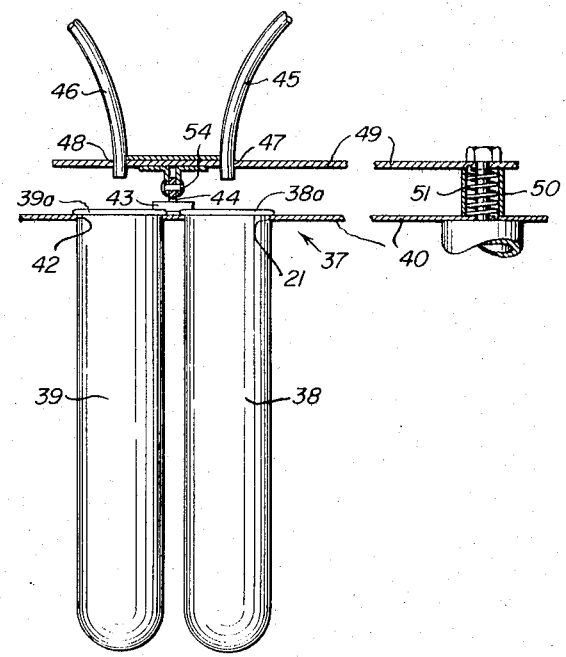
INVENTOR.
ALLISON B. STOUT Jr.
BY
ATTORNEYS

United States Patent Office 3,299,700
Patented Jan. 24, 1967

3,299,700
DIRECTIONAL AIR SAMPLER
Allison B. Stout, Jr., Salt Lake County, Utah, assignor to Kennecott Copper Corporation, New York, N.Y., a corporation of New York
Filed Apr. 2, 1964, Ser. No. 356,823
6 Claims. (Cl. 73—170)

This invention relates to devices for sampling atmospheric air for subsequent analysis.

With the increase in world population, air polluted by many sources such as industrial plants, vehicle exhaust, trash burning, etc., has become a major problem that must be overcome. Recognizing this, governments, civic organizations, and industrial plants have increased efforts to prevent impurities from being added to the atmosphere.

Accomplishing this has first required an analysis of atmospheric air surrounding potential pollution sources to determine what impurities are being added, and then a development of means to prevent the additions. This analysis has proven time consuming and unduly burdensome. Furthermore, where there are two or more such sources in the vicinity, it has often proved extremely difficult to determine which source, or sources contribute to pollution of the air, which impurities are being added by which source, and what hte percentage contribution of each source is to the total noxious gas content of the air.

In accordance with the invention, impurities from atmospheric air are collected throughout predetermined periods of time recurring continuously or at predetermined intervals, the volume of air containing the collected impurities is measured, the prevailing wind directions and velocities during the collection period are determined, and impurities collected during any given period are segregated from those collected during other periods.

Primary objects of the present invention are to provide simplified and effectively correlated structure for continually collecting impurities added to atmospheric air, for periodically segregating samples so collected, for indicating prevailing wind directions and wind velocities during the collection period, and for measuring and recording the volume of air from which impurities are collected for each sample.

Outstanding features of the invention include the provision of a plurality of containers for an impurities-absorbing reagent; means to control flow of atmospheric air through the absorption reagent in the containers, selectively, in accordance with the position of a wind direction indicator; an air meter for measuring the volume of air passed through the absorption reagent; an anemometer; means, such as a plurality of standard pen recorders actuated individually in accordance with the position of the wind direction indicator and the speed of the anemometer, for recording the volume of air passing through the absorption reagent and the anemometer-measured wind velocity, respectively; and means to periodically remove from the containers the collected samples of absorption reagent through wthich air has been passed and to provide an additional supply of reagent to the containers for continuing absorption of atmospheric impurities.

Other important features are the provision of means for maintaining a substantially constant level of impurities-absorbing reagent in the containers, and a means for automatically removing and storing samples of absorption reagent through which air has been passed for a predetermined period of time, such that the samples taken frequently, on a daily basis, for example, need to be collected for analyzing purposes only at infrequent intervals, i.e., once a week.

There is shown in the accompanying drawings a specific embodiment of the invention representing what is presently regarded as the best mode of carrying out the generic concepts in actual practice. From the detailed description of this presently preferred form of the invention, other more specific objects and features will become apparent.

Figure 2:
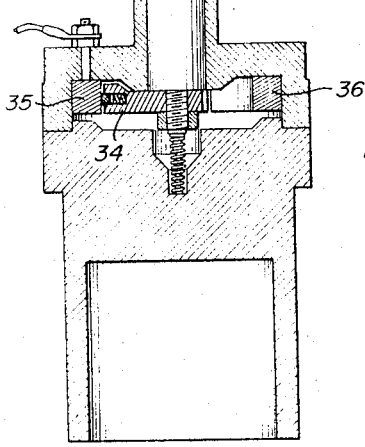

In the drawings:

FIG. 1 is a schematic representation of the apparatus of the invention and the electrical control circuit therefor;

FIG. 2, a vertical cross-sectional view of the wind direction indicator of the invention;

FIG. 3, a top plan view of the sample tube rack and solenoid actuator of the invention;

FIG. 4, a view in vertical section taken on line 4—4 of FIG. 3; and

FIG. 5, a view in vertical section taken on line 5—5 of FIG. 3.

Referring to the drawings:

In the illustrated preferred embodiment, a pair of containers 10 and 11 are positioned to receive an impurities-absorbing, liquid reagent from a storage reservoir 12. Reservoir 12 is sealed, except for an opening for outlet conduit 13 interconnecting the reservoir and a levelling vessel 14 positioned below reservoir 12 and adjacent to containers 10 and 11. A conduit 15 extends from the bottom of vessel 14 to a valve 16, and a pair of conduits 17 and 18 interconnect the valve and the bottoms of containers 10 and 11.

When valve 16 is open, the level of absorption reagent in the containers 10 and 11 is controlled by the position of the lower end of conduit 13. Since containers 10 and 11 and vessel 14 are interconnected at their bottoms, the same liquid level will be maintained in all three. When the level has risen sufficiently to cover the end of conduit 13 in vessel 14, no air can get into reservoir 12, a vacuum is formed, and additional reagent cannot flow into vessel 14. Should the level of reagent in containers 10 and 11 and vessel 14 fall, the vacuum is broken by air entering upwardly through conduit 13 and enough reagent is released from the reservoir to again bring the level of reagent in the containers and levelling vessel to desired height, sealing the lower end of conduit 13.

Air inlet conduits 19 and 20 enter the bottoms of containers 10 and 11, and reagent stands in them level with that in the containers. Vacuum pump 21 forces atmospheric air through the absorption reagent in containers 10 and 11, the air entering through inlet lines 19 and 20 and exiting via valves 22 and 23 in conduits 24 and 25, common conduit 26, air meter 27, and the pump. Each cubic foot of air passing through the air meter 27 generates a pulse which is transmitted by a circuit to be described, to one of the conventional wind-volume recorders 28 or 29, where the pulse is recorded.

Vacuum pump 21 and valve 16 are controlled by a continuously operating timer 30 such that for short intervals the vacuum pump is periodically shut off and the valve opened to allow make-up reagent from reservoir 12 to bring the liquid level in the containers up to the lower end of tube 13 in the manner previously described. This is desirably accomplished at half-hour intervals. If the reagent level has not dropped, no reagent will flow from reservoir 12.

A wind direction indicator 31 continually indicates wind direction and actuates either valve 22 and wind-volume recorder 28, or valve 23 and wind-volume recorder 29, according to the prevailing wind direction. Assuming valve 22 and wind-volume recorder 28 are actuated, the valve will be opened to allow air flow through the absorption reagent in container 10, and through air meter 27, as previously described. As the air flows through the air meter, an impulse is generated for each cubic foot of air. These are transmitted to recorder 28 and recorded.

Similarly, opening of valve 23 and actuation of recorder 29 results in flow of atmospheric air through container 11 and a recording of the volume of air passed through meter 27, this time on recorder 29.

As illustrated, only two reagent containers and two wind-volume recorders are employed, and they will be actuated according to which of two phases of its pivot circle a contact arm 34 (FIG. 2) of the indicator 31 is facing.

Air velocity is continuously measured by anemometer 32 and is recorded on recorder 33, the chart of which is time synchronized with the charts of recorders 28 and 29.

The pivotally mounted vane of indicator 31 will always point into the wind, and if, for example, the wind comes from a 90° to 270° phase, contact arm 34 will engage half-ring 35, thereby completing a circuit to actuate valve 22 and recorder 28, whereas wind from a 270° to 90° phase will cause the vane to change directions and contact arm 34 to engage nonconducting half-ring 36, and, as will be further explained, result in operation of valve 23 and recorder 29.

In order to obtain regular samples of reagent through which air has been bubbled, without continuous or frequent attention of the apparatus, a rack 37, carrying sample tubes 38 and 39, is provided.

Rack 37 includes a fixed plate 40 having paired rows 41 and 42 of holes through which the sample tubes are suspended by peripheral flanges 38a and 39a. A row of stops 43 is provided between the two rows of holes, with one stop intermediate adjacent holes in the same row. These stops cooperate with a pivoted latch lever 44 to sequentially position discharge conduits 45 and 46, respectively, leading from the bottoms of containers 10 and 11 through spaced discharge ports 47 and 48 in solenoid support arm 49.

Solenoid support arm 49 is mounted for swinging movement on post 50 extending upwardly from plate 40 and is biased counterclockwise about post 50 by clock-spring 51. Mounted on support arm 49 are a solenoid 52, including a bifurcated solenoid rod 53, and latch lever 44.

Latch lever 44 is pivoted intermediate its length on pivot pin 54 fixed to support arm 49 and on pivot pin 55 interconnecting the bifurcated portions of rod 53. The end of lever 44 adjacent pivot pin 54 is angulated to form a hook 56 that will engage stops 43, in a manner to be explained. The other end of lever 44 includes a detent 57, also arranged to engage stops 43, and the bottom surface 58 of lever 44 is shaped to insure free sliding movement of the lever over stops 43 when the catch and detent are not in engagement with the stops.

When solenoid 52 is de-energized, rod 53 is spring biased outwardly therefrom and detent 57 is forced downwardly against plate 40, where it will engage one of the stops 43 as spring 51 rotates support arm 49. When the solenoid is energized, rod 53 is retracted, raising detent 57 and lowering hook 56. This allows lever 44 to move, under the biasing influence of spring 51, over the stop previously engaged by detent 57, until the stop is engaged by hook 56. Discharge conduit 45 will then be positioned over one of the sample tubes 38 in row 41, and discharge conduit 46 will be positioned above one of the sample tubes 39 in row 42.

In operation, power is supplied to the anemometer through lines 60 and 61 upon closing of control switch 62. The speed of rotation of anemometer 32 determines the frequency of current flow therethrough to line 63, relay coil 64, and line 61. Whenever current flows through the anemometer, coil 64 is energized, closing switch 65 and completing a circuit including lines 60 and 66, switch 65, line 67, velocity recorder 33, and lines 68 and 61, to cause the velocity recorder pen to mark its chart.

At the same time a circuit is completed through lines 60 and 69, motor 70 of timer 71, and lines 72 and 61, to start operation of motor 70. Motor 70 drives a cam, not shown, to periodically close switch 73. In the present instance switch 73 is closed once every twenty-four hours and remains closed for five minutes. Closing of switch 73 completes a circuit through lines 61, 72, motor 74 of timer 75, lines 76, 77, 69 and 60, to start motor 74. Normally closed thermal delay switch 78 in line 76 insures actuation of motor 74 only once each time switch 73 is closed. Thus, whenever coil 79 of switch 78 is heated for approximately fifteen seconds, contact 80 of the switch is opened to break the energizing circuit for motor 74. At the same time a circuit is completed through lines 60, 72, 81, 82, 76, 77, 69 and 61 to energize solenoid 52 and to move discharge conduits 45 and 46 over the sample tubes in the manner previously disclosed. The solenoid remains actuated to hold discharge conduits 45 and 46 in position, even after time delay switch 78 has opened, because of a holding circuit completed through switch blade 83 when it moved from engagement with contact 84 to engagement with contact 85 in response to starting of motor 74. This circuit, including lines 61 and 72, motor 74, switch blade 83, and lines 69 and 60, is maintained for a predetermined period according to the setting of timer 75, and continues energization of both solenoid 52 and motor 74. Five minutes has been found to be a desirable time interval, and during this five minute period, since switch blade 83 is no longer engaging contact 84 to complete the vacuum pump energization circuit, vacuum pump 21 is shut off.

After the sample tubes 45 and 46 have been respectively positioned over a sample tube 38 and 39 and during operation of motor 74, the motor drives a sequence cam (not shown) to briefly close switch 86 and complete a circuit through lines 60, 69, 87, 88, 89, 81, 72 and 61. This opens solenoid valves 90 and 91 and allows absorption reagent in containers 10 and 11 to drain through discharge conduits 45 and 46 and into the sample tubes 38 and 39 positioned therebeneath. In the illustrated embodiment this operation is continued for two minutes before switch 86 is again opened, and valves 90 and 91 are closed.

Switch 92 is then closed by another sequential cam (not shown), completing a circuit through lines 60, 69, 92–1, 92–2, 81, 72 and 61 to open valve 16 and allow impurity-absorbing reagent to again fill containers 10 and 11 in the manner previously described.

After a short period of time, i.e. two minutes, switch 92 is opened and valve 16 is again closed. Shortly thereafter timer 75 completes its cycle, switch blade 83 moves back to contact 84, motor 74 is stopped, solenoid 52 is de-energized, and vacuum pump 21 is started. Catch 55 on lever 43 is released from engagement with stop 42, and the arm and lever are pivoted such that detent 56 engages the next stop 43, and holds the support arm 48 in position for another cycle of operation of the unit in accordance with the programming of timer 71.

Normally, only one sample will be taken per day, and except when timer 71 is setting timer 75 in operation, vacuum pump 21 will operate to draw atmospheric air through one or the other of the air inlet conduits 19 or 20, the absorption reagent in the corresponding container 10 or 11, valve 22 or 23, and common conduit 26. In the illustrated embodiment, rotation of the indicator vane 31 through its 90° to 270° phase completes a circuit through lines 60, 93, 94 and 61 to energize coil 95 of relay 96. This moves switch blades 97 and 98 to the left (as viewed in FIG. 1) and completes the energization circuits for valve 23 through lines 60, 99, 100, 101, 81, 72 and 61 and for actuation of wind-volume recorder 29 through lines 61, 102, 103, 103–1, 99 and 60. When the indicator vane is within its 270° to 90° phase, the energization circuit to relay coil 95 is broken and switches 97 and 98 move to the illustrated position, completing a circuit through lines 60, 99, 104, 101, 81, 72 and 61 to open valve 22, and a circuit through lines 61, 102, 105, 103–1, 99 and 60 to actuate wind-volume recorder 28. Thus, whenever the indicator vane is in one phase, air flow is through the reagent in container 10; when it is the other phase, air flow is through container 11. In either event the air passes through air meter 27 and the volume sampled is recorded on the appropriately actuated wind-volume recorder. An examination of the two recorder charts will readily show from which of the two general directions the wind was blowing during the sampling period, and the percentage of the total volume of air tested that was obtained from each of the two general directions can be readily calculated.

With the illustrated arrangement, the impurities in the air can be readily accumulated in the impurity-absorbing reagent, the volume of air from which the impurities are removed can be measured, and the volume of impurities coming from each of two general directions can be readily measured and compared against the total air volume coming from the same two general directions. This data makes it a simple matter to calculate the percentages of impurities coming from the two general areas. Knowledge of wind velocity then provides a basis for the determination of the actual source or sources of the collected impurities.

Obviously, additional absorption reagent containers, rows of sample tubes, and wind-volume recorders could easily be provided to increase the number of direction phases from which samples are obtained. This would merely require slight modification of the control circuit to properly regulate the added components. A single Speedomax G model recorder, manufactured by Leeds and Northrup Co., Philadelphia, Pennsylvania, and fitted with three marking pens to record on a single chart, has also been found satisfactory. In many instances this plural pen, single chart arrangement may be desirably employed rather than the three recorder system illustarted.

If desired, manually operated test switches 106 and 107 can be provided as a means to test operation of the unit without requiring the use of an operational direction indicator.

Closing of switch 106 energizes solenoid 52 and allows a check to be made on the operation of the sample tube carrying rack operation. It also starts timer 74 and allows the user to see if valves 16, 90 and 91 are all functioning in proper sequence. This constitutes an operational check on the operation of the absorption reagent refill apparatus.

During automatic operation the movable contact of switch 107 must be in engagement with fixed contact 108, as shown, to insure energization of coil 95 of relay 96 whenever the direction indicator is conducting, as previously disclosed. When no direction indicator is connected in the circuit, for test purposes, switch contact 81 can be moved into engagement with fixed contact 109 to complete a circuit energizing the relay coil and moving switch contacts 97 and 98 to activate wind-volume recorder 29 and to open valve 23. Switch 107 can also be manually moved to the position illustrated. Without a direction indicator in the circuit, the circuit is open, relay coil 95 is de-energized, and switch contacts 96 and 97 are moved to their illustrated position, i.e. the same position they would be in if the system were automatically operating and the direction recorder was nonconducting, as previously described. In this instance the operation of wind-volume recorder 27 and valve 21 can be tested.

Whereas there is here illustrated and specifically described a certain preferred construction of apparatus which is presently regarded as the best mode of carrying out the invention, it should be understood that various changes may be made and other constructions adopted without departing from the inventive subject matter particularly pointed out and claimed herebelow.

I claim:

1. A directional air sampler comprising a sealed storage reservoir for a liquid reagent adapted to absorb impurities from an air sample; a leveling vessel positioned beneath said reservoir; a drain conduit extending from the bottom of said reservoir to a predetermined height in the leveling vessel; a pair of sample containers; a conduit interconnecting said leveling vessel, below the end of the drain conduit and the sample containers; a normally open solenoid valve in said conduit interconnecting the leveling vessel and the sample containers, whereby when said valve is opened, liquid reagent level in the leveling vessel and the sample containers will be maintained at the height of the end of the drain conduit in the leveling vessel; a discharge conduit from the bottom of each sample container; a normally closed solenoid valve in each discharge conduit; a sample tube positioned beneath each discharge conduit to receive liquid reagent from the sample containers when the valves in the discharge conduits are open; an air inlet conduit extending from a point above the level of liquid reagent in the leveling vessel to the bottom of each sample container; a vacuum pump having an intake and an outlet; conduit means interconnecting the top of each of said sample containers with the intake of said vacuum pump; a pair of solenoid valves, one of said valves controlling flow of air from one of said sample containers to the vacuum pump and the other controlling flow from the other of said sample containers to the vacuum pump; an air meter, positioned in said conduit means interconnecting the sample containers and the vacuum pump, whereby the volume of air flow through the sample containers is measured by said meter; a pair of wind-volume recorders; a wind direction indicator; means opening and closing the pair of solenoid valves controlling flow of air from the sample containers, individually, in accordance with wind direction indicated by the wind direction indicator and for simultaneously selectively actuating the wind-volume recorders, whereby one solenoid valve is opened whenever one recorder is actuated, while simutlaneously the other solenoid valve is closed and the other recorder de-actuated, and vice versa; an anemometer; a wind-velocity recorder, said windvelocity recorder being time synchronized with the windvolume recorders; means to actuate said velocity recorder in accordance with wind velocity measured by said anemometer; and means to periodically stop said vacuum pump, open said discharge valves, and close the valve in the conduit interconnecting the leveling vessel and the sample containers for a predetermined period of time, whereby said liquid absorbent reagent is discharged from the containers to the sample tubes positioned therebelow.

2. A sample tube support rack comprising a plate; an arcuate row of sample tube receiving holes formed through said plate; a support post positioned equidistant each of said holes; a pivot arm journaled on said support post; means biasing said pivot arm in one direction around said support post; a solenoid carried by said pivot arm; a discharge port through said pivot arm, said discharge port being positioned above the centerline of said row of holes during rotation of the pivot arm thereabove; a row of stop means on said plate, said stop means being spaced between adjacent holes; a solenoid rod; and a latch lever including a stop means engaging detent on one end and a hook on the other end, said latch lever being pivotally connected intermediate its length to the pivot arm and the solenoid rod, whereby energizing of said solenoid to withdraw the solenoid rod and pivot the latch lever about its connection with the pivot arm raises said detent from sop means engaging position and places said hook in stop means engaging position.

3. A directional air sampler, comprising a plurality of containers for liquid reagent adapted to absorb impurities from an air sample, each container having an air inlet at its bottom and an air outlet at its top; a wind direction indicator; means to selectively control flow of atmospheric air through reagent in the containers in accordance with the position of the wind direction indicator; valve means for periodically discharging spent reagent from the containers; power circuit means responsive to completion of a sampling operation to operate said valve means to discharge said spent reagent and to prepare said containers for receiving additional reagent; and means for segregating from one another the periodic discharges of spent reagent, the segregating means including a rack; a concentric plurality of arcuate rows of sample tubes supported by said rack, one row for each container; a support post fixed on the rack equidistant from the sample tubes of one row; a support arm journaled on said support post; means biasing said support arm in one direction around said post; a plurality of discharge ports through said support arm, one discharge port being positioned to pass over each row of sample tubes as the support arm is pivoted; a flexible discharge conduit interconnecting each container with one of the discharge ports; a solenoid carried by the support arm; a plurality of stop means on the rack; and latch means carried by the support arm and responsive to energization of the solenoid to sequentially engage the stop means and sequentially position each discharge port over the sample tubes in its corresponding row.

4. A directional air sampler, comprising a plurality of containers for liquid reagent adapted to absorb impurities from an air sample, each container having an air inlet and an air outlet; a wind direction indicator; means to selectively control flow of atmospheric air through reagent in the containers in accordance with the position of the wind direction indicator; valve means for periodically discharging spent reagent from the containers; power circuit means responsive to completion of a sampling operation to operate said valve means to discharge said spent reagent and to prepare said containers for receiving additional reagent; and means for segregating from one another the periodic discharges of spent reagent, the segregating means including a rack; a plurality of rows of sample tubes supported by said rack, one row being provided for each of said containers; discharge means having a plurality of discharge ports corresponding in number with said rows of tubes, said discharge means being movable over said rows so that said discharge ports come into registry sequentially with respective sample tubes in respective rows; means for holding said discharge means in position during passage of reagent from the containers concerned into the sample tubes concerned; and means for periodically moving said discharge means to different sample tubes.

5. A directional air sampler according to claim 4, further including an air meter positioned to measure the volume of air passed through reagent in the containers; air volume recorders corresponding to the respective containers, said recorders being time synchronized with one another; and means responsive to the wind direction indicator and the air meter to record the volume of air passing through each container on its corresponding air volume recorder.

6. A directional air sampler according to claim 5, further including a wind velocity recorder time synchronized with the air volume recorders; an anemometer; and means for actuating said wind velocity recorder to record the velocity sensed by said anemometer.

References Cited by the Examiner

UNITED STATES PATENTS

| | | | |
|---|---|---|---|
| 1,101,568 | 6/1914 | Roberts | 141—130 |
| 2,078,203 | 4/1937 | Manning | 137—453 |
| 2,490,319 | 12/1949 | Palsgrove | 137—453 |
| 2,665,585 | 1/1954 | Marcell et al. | 141—130 |
| 2,699,679 | 1/1955 | Munger | 73—170 |
| 2,894,542 | 7/1959 | Alm | 141—130 |
| 2,982,131 | 5/1961 | Rosinski | 73—421.5 |
| 3,213,669 | 10/1965 | Taft et al. | 73—23.1 |

RICHARD C. QUEISSER, *Primary Examiner.*

L. R. FRANKLIN, J. J. SMITH, *Assistant Examiners.*